US008147320B2

(12) United States Patent
Englman et al.

(10) Patent No.: US 8,147,320 B2
(45) Date of Patent: Apr. 3, 2012

(54) ADJUSTMENT OF AWARDS IN PROGRESSIVE SYSTEM BASED ON WAGER

(75) Inventors: Allon G Englman, Chicago, IL (US); Joel R. Jaffe, Glenview, IL (US); Shridhar P. Joshi, Naperville, IL (US); Michael W. Mastropietro, Chicago, IL (US); Christopher J. Frattinger, Sparks, NV (US)

(73) Assignee: WMS Gaming Inc., Waukegan, IL (US)

( * ) Notice: Subject to any disclaimer, the term of this patent is extended or adjusted under 35 U.S.C. 154(b) by 1112 days.

(21) Appl. No.: 11/920,611

(22) PCT Filed: May 30, 2006

(86) PCT No.: PCT/US2006/020953
§ 371 (c)(1),
(2), (4) Date: Nov. 16, 2007

(87) PCT Pub. No.: WO2006/130597
PCT Pub. Date: Dec. 7, 2006

(65) Prior Publication Data

US 2009/0131159 A1 May 21, 2009

Related U.S. Application Data

(60) Provisional application No. 60/685,907, filed on May 31, 2005.

(51) Int. Cl.
*A63F 13/00* (2006.01)
*G06F 19/00* (2006.01)

(52) U.S. Cl. ............................................ 463/25; 463/27

(58) Field of Classification Search .............. 463/16–20, 463/42, 25, 27; 273/192
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,861,041 | A | 8/1989 | Jones et al. | 273/292 |

(Continued)

FOREIGN PATENT DOCUMENTS

CA 2 334 546 2/2001

(Continued)

OTHER PUBLICATIONS

International Search Report dated Aug. 20, 2006, PCT/US06/20953 (2 pages).

(Continued)

*Primary Examiner* — Masud Ahmed
(74) *Attorney, Agent, or Firm* — Nixon Peabody LLP

(57) ABSTRACT

A gaming system for conducting a wagering game includes a progressive jackpot awarded in response to a jackpot win event. The gaming system includes a first gaming machine linked to the progressive jackpot, the first gaming machine accepting a first wager. The gaming system further includes a second gaming machine linked to the progressive jackpot, the second gaming machine accepting a second wager that is greater than the first wager. A first player making the first wager at the first gaming machine is awarded the progressive jackpot if the jackpot win event is associated with the first gaming machine. A second player making the second wager at the second gaming machine is awarded the progressive jackpot plus an expected value equalizing award if the jackpot win event is associated with the second gaming machine.

14 Claims, 7 Drawing Sheets

U.S. PATENT DOCUMENTS

| | | | | |
|---|---|---|---|---|
| 4,948,134 | A | 8/1990 | Suttle et al. | 273/85 |
| 5,116,055 | A | 5/1992 | Tracy | 273/138 |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |
| 5,344,144 | A | 9/1994 | Canon | 273/138 |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,639,088 | A | 6/1997 | Schneider et al. | 273/138.2 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,830,063 | A | 11/1998 | Byrne | 463/18 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 7,255,645 | B2 | 8/2007 | Steil et al. | 463/27 |
| 7,578,739 | B2 * | 8/2009 | Gauselmann | 463/27 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148808 | A1 | 8/2003 | Price | 463/27 |
| 2003/0181231 | A1 * | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Engleman | 463/16 |
| 2005/0055113 | A1 * | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2005/0239542 | A1 * | 10/2005 | Olsen | 463/27 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0073887 | A1 | 4/2006 | Nguyen et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |

| | | | | | |
|---|---|---|---|---|---|
| 2006/0183538 | A1 * | 8/2006 | Michaelson et al. | ............ | 463/27 |
| 2006/0281527 | A1 | 12/2006 | Dunaevsky et al. | ............ | 463/20 |
| 2006/0287077 | A1 | 12/2006 | Grav et al. | ...................... | 463/27 |
| 2007/0026941 | A1 | 2/2007 | Block et al. | ..................... | 463/29 |
| 2007/0054733 | A1 | 3/2007 | Baerlocher | ..................... | 463/27 |
| 2007/0060244 | A1 | 3/2007 | Yaldoo et al. | ................... | 463/16 |
| 2007/0060271 | A1 | 3/2007 | Cregan et al. | ................... | 463/16 |
| 2007/0060314 | A1 | 3/2007 | Baerlocher et al. | ............. | 463/25 |
| 2007/0060319 | A1 | 3/2007 | Block et al. | ..................... | 463/27 |
| 2007/0060365 | A1 | 3/2007 | Tien et al. | ....................... | 463/42 |

FOREIGN PATENT DOCUMENTS

| | | | |
|---|---|---|---|
| CA | 2 334 546 | | 8/2001 |
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Easy Riches” by Sigma Game, Strictly Slots, 1 page (Aug. 2001).
Article for “Millioniser” by Glenn Haussman, Strictly Slots, pp. 50-53 (Mar. 2004).
Product Sheet for “Big Games Safari,” IGT, 24 pages (2000).
“New ’97 Games,” International Gaming & Wagering Business, 24 pages (Mar. 1997).

* cited by examiner

ADJUSTMENT OF AWARDS IN PROGRESSIVE SYSTEM BASED ON WAGER

CROSS-REFERENCE TO RELATED APPLICATIONS

This application is a U.S. national phase of, and claims priority to, International Application No. PCT/US2006/020953 filed May 30, 2006, which claims the benefit of priority of U.S. Provisional Patent Application No. 60/685,907, filed May 31, 2005, both of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a variable progressive award.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

With some progressive jackpot systems, a player is required to place a maximum bet at a gaming machine in order to be eligible for winning the progressive jackpot. This may cause a perceived unfairness to a player who wishes to wager less than the maximum bet while playing the gaming machine. Another progressive jackpot system varies the probability of winning the progressive jackpot with the amount of the player's wager. Thus a player wagering more on a play of the gaming machine has an increased probability of winning the progressive jackpot. Thus, a player wagering relatively lower amounts while playing the gaming machine may perceive his opportunity to win the progressive jackpot as being very low. The present invention is directed to an alternate progressive jackpot system that satisfies one or more of these needs and solves other problems.

SUMMARY OF THE INVENTION

According to one aspect of the present invention, a gaming system for conducting a wagering game includes a progressive jackpot awarded in response to a jackpot win event. The gaming system comprises a first gaming machine linked to the progressive jackpot, the first gaming machine accepting a first wager. The gaming machine further comprises a second gaming machine linked to the progressive jackpot, the second gaming machine accepting a second wager that is greater than the first wager. A first player making the first wager at the first gaming machine is awarded the progressive jackpot if the jackpot win event is associated with the first gaming machine. A second player making the second wager at the second gaming machine is awarded the progressive jackpot plus an expected value equalizing award if the jackpot win event is associated with the second gaming machine.

According to another aspect of the invention, a method of conducting a wagering game on a gaming system having a progressive jackpot awarded in response to a jackpot win event comprises receiving a first wager from a first player at a first gaming machine linked to the progressive jackpot. The method further comprises receiving a second wager from a second player at a second gaming machine linked to the progressive jackpot, the second wager being greater than the first wager. The method includes, in response to receiving the first wager and associating the jackpot win event with the first gaming machine, awarding the progressive jackpot to the first player. The method further includes, in response to receiving the second wager and associating the jackpot win event with the second gaming machine, awarding the progressive jackpot plus an expected value equalizing award to the second player.

According to yet another aspect of the invention, a computer readable storage medium is encoded with instructions for directing a gaming device to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1:
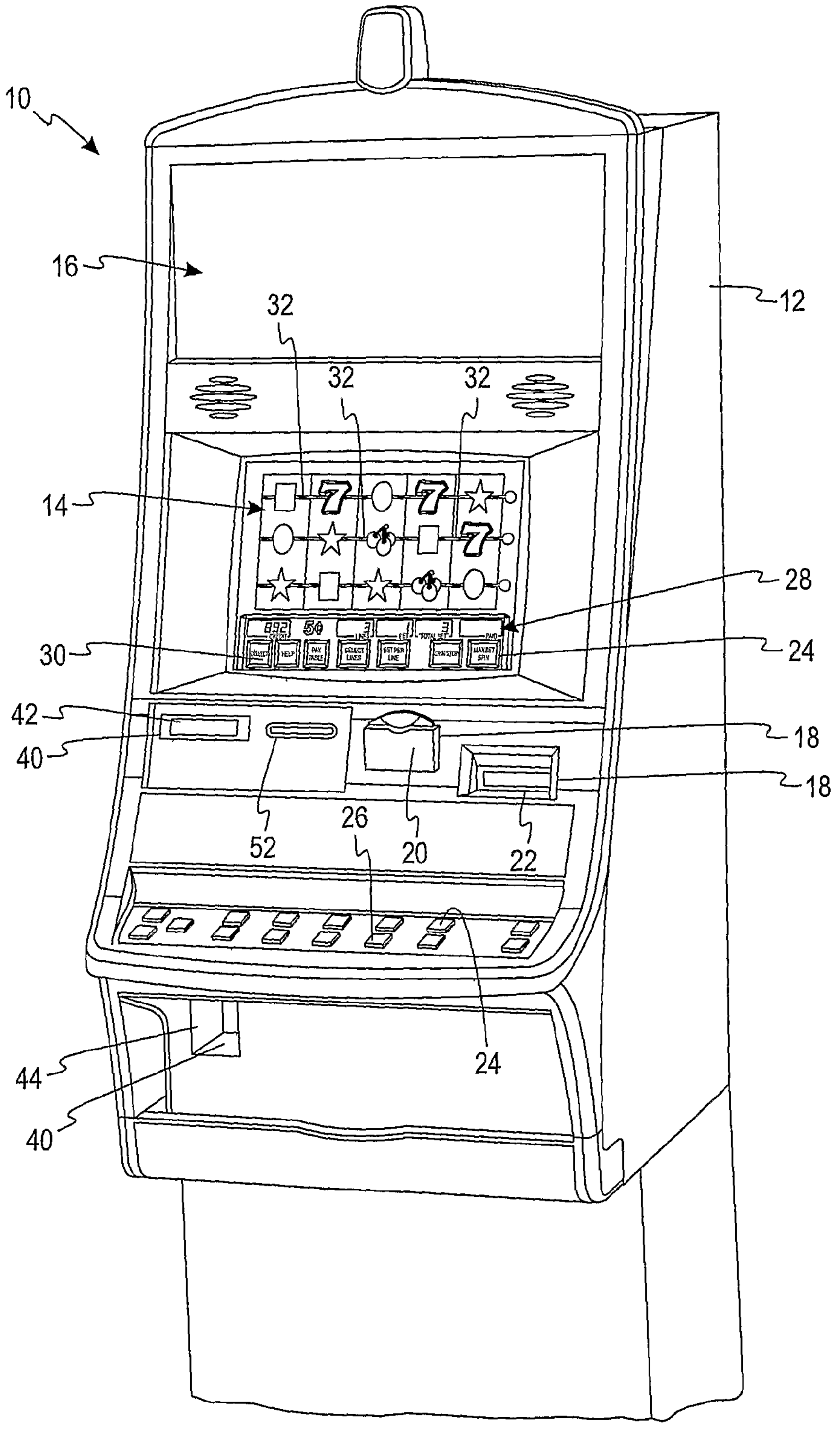
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an “upright” version in which the primary display 14 is oriented vertically relative to the player. Alternatively, the gaming machine may be a “slant-top” version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment’s loyalty club and may be awarded certain complimentary services as that player collects points in his or her player-tracking account. The player inserts his or her card into the player information reader 52, which allows the casino’s computers to register that player’s wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
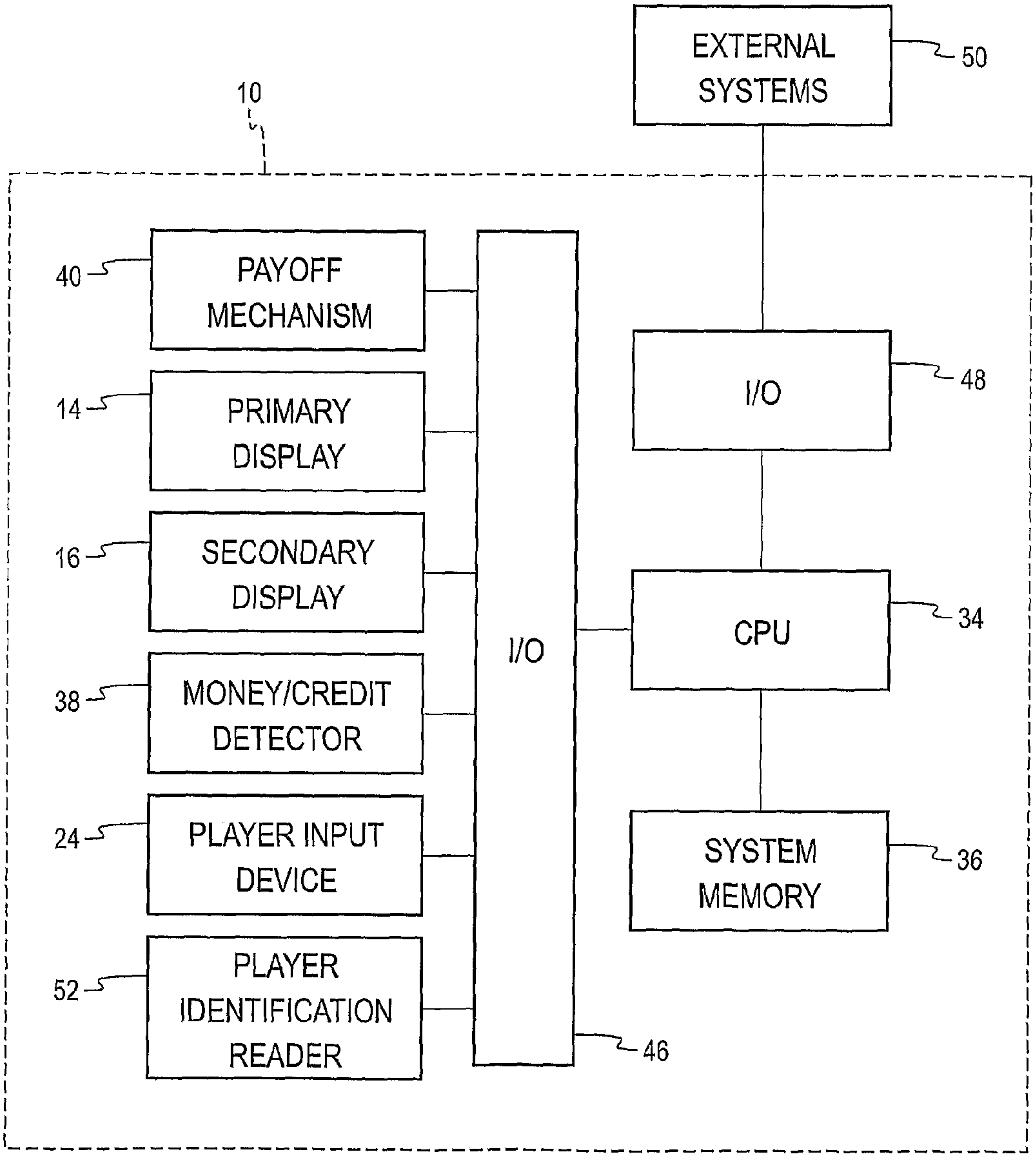
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
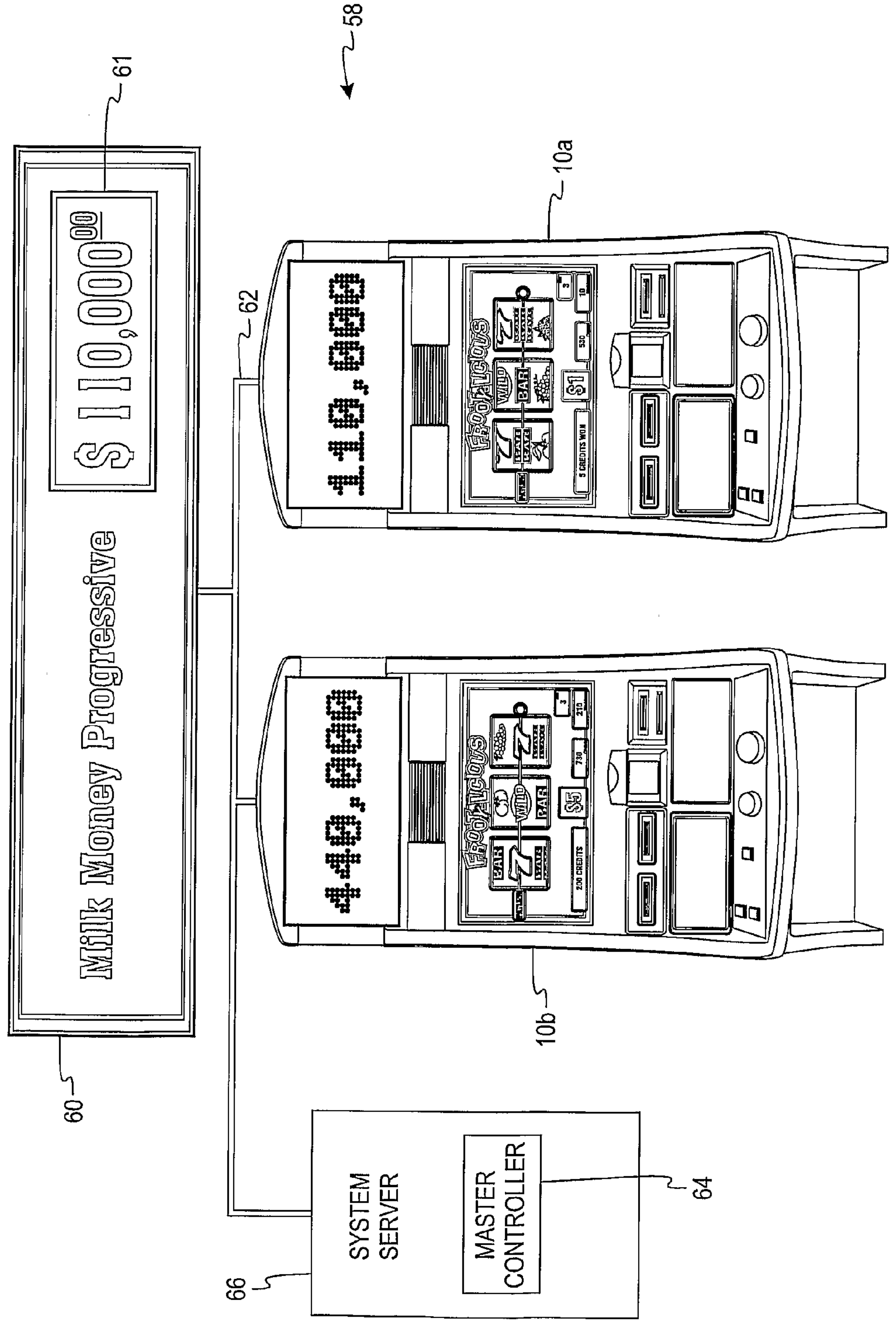
FIG. 3 is a perspective view of a gaming machine and signage according to one embodiment of the present invention.

Turning now to FIG. 3, a gaming system 58 of the present invention is depicted. The gaming system 58 comprises a plurality of gaming machines 10*a,b* and includes a central display 60. The gaming machines 10*a,b* are networked together via a network 62. The network 62 may include any variety of communication devices, including wired and wireless connections. The gaming system 58 may also include a master controller 64, which is preferably located within a system server 66. The master controller 64 and system server 66 are preferably securely located remotely from the gaming machines 10*a,b* and central display 60. The gaming machines 10*a,b* and central display 62 are preferably located within a casino or other gaming establishment thereby providing access to the machines 10*a,b*, to players. The machines 10*a,b* and the central display 60 communicate with the master controller 64 via the network 62.

The gaming system 58 includes a progressive jackpot 61 displayed on the central display 60 which is available to be won by play at one or more of the individual gaming machines 10*a,b*. The central display 60 displays information relating to the progressive jackpot 61, including the current amount of the progressive jackpot. The central display 60 may include additional information, including historical information of prior progressive jackpots awarded, casino information, or other game related information. The central display 60 is a communal overhead display shared by the gaming machines 10*a,b* instead of being specific to one of the machines 10*a,b*.

As seen in FIG. 3, the first gaming machine 10*a* of the system 58 is a 25 cent denomination machine having a minimum bet of 25 cents. The first machine 10*a* allows a range of 1 to 5 credits to be played, and thus has a corresponding maximum wager amount of $1.25. The second gaming machine 10*b* of the system 58 is a $1.00 denomination machine having a minimum bet of $1.00. Like the first machine 10*a*, the second machine 10*b* allows a range of 1 to 5 credits to be played. Thus, the second machine 10*b* has a maximum wager amount of $5.00. The system 58 is illustrated as having only two gaming machines 10*a,b*, and therefore has a system minimum wager of 25 cents and a system maximum wager of $5.00. However, it should be understood that the system may have any number of gaming machines 10 linked to the progressive jackpot 61. Furthermore, the machines 10 may be configured to have fixed denominations, such as those shown in FIG. 3, or could have player selectable denominations and other customizable features. The progressive jackpot of the gaming system 58 is available to be won through play at any of the gaming machines 10*a,b*. The progressive jackpot 61 comprises a progressive base amount (or reset amount) and an incremental amount. In the embodiment depicted in FIGS. 3-7, the progressive base amount is $100,000 and the incremental amount is $10,000. The progressive jackpot 61 is displayed on the central display 60.

Figure 4:
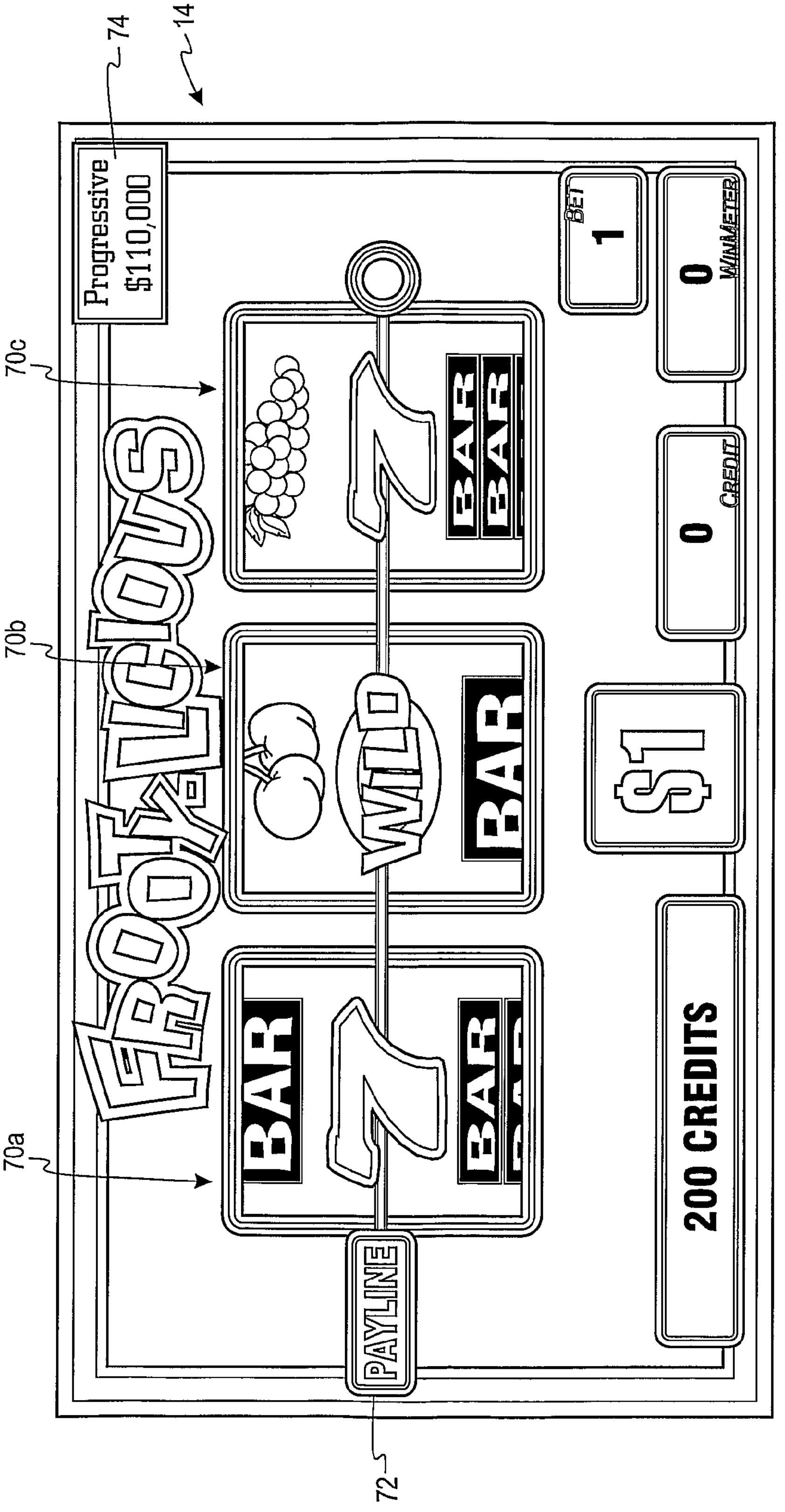
FIG. 4 is an initial screen of the primary display of the gaming machine of FIG. 1.

Turning now to FIG. 4, each of the gaming machines 10*a,b*, in the system 58 executes a primary wagering game on the display 14 of the gaming machine. In this embodiment the primary game is a slot game comprising three reels 70*a,b,c* and a single payline 72. The primary display 14 of the gaining machine 10 may optionally include a progressive jackpot meter 74 so that the player may view the current amount of the progressive jackpot at the gaming machine 10 as well as via the central display 60. Furthermore, each machine 10*a,b* may optionally execute a secondary or bonus game as described herein with reference to FIG. 1. The gaming machine 10 has at least one winning outcome which is a progressive jackpot winning outcome, which may be awarded either during the primary game or the bonus game. In this embodiment, the progressive jackpot winning outcome is a "Three Sevens" outcome during the primary game such that three "7" symbols on the three reels 70*a,b,c* land on the payline 72.

The gaming machines 10*a,b* each individually have a minimum wager amount and a maximum wager amount. Furthermore, each gaming machine 10*a,b* utilizes a base denomination, which preferably is equal to the minimum wager amount. The base denominations of each gaming machine 10*a,b* may be, and preferably is different from at least one of the other gaming machines 10*a,b* in the system 58. For each gaming machine 10*a,b* the maximum wager amount is a multiple of the base denomination reflective of a range of "coins" or "credits" that the machine 10*a,b* accepts. For example, in FIG. 4, the gaming machine may have a base denomination of $1.00, and allow the player to play between 1 and 5 credits on each wager, thereby making the minimum wager amount $1.00 (1 coin) and the maximum wager amount $5.00 (5 coins).

The progressive jackpot 61 is funded by a percentage of the system minimum wager amount, in this case 25 cents. Thus, for example, two percent of the system minimum wager amount of 25 cents (0.5 cents) is used to fund the progressive jackpot 61 for each play of each gaming machine 10*a,b* in the system 58. The funding amount of two percent of the system minimum wager amount is constant regardless of the amount of an actual wager on a particular play of gaming machine 10*a,b*. For example, in FIG. 3, if a first player playing the first gaming machine 10*a* makes a wager of 25 cents, two percent of the system minimum wager amount (equal to 0.5 cents) is used to fund the progressive jackpot 61. If a second player playing the second gaming machine 10*b* wagers $1.00, the same amount (0.5 cents) of that wager is diverted to fund the progressive jackpot 61. In this way, the progressive jackpot 61 increments by the same amount in response to a player's wager on a play of the gaming machine 10*a,b*, regardless of the amount of the wager. However, in accordance with the present invention, the second player, because his wager exceeds the system minimum wager amount, is eligible to win an enhanced award that exceeds the amount of the progressive jackpot 61. In the illustrated examples below, the probability of winning the progressive jackpot 61 is independent of the amount of the player's wager, i.e. all players have the same probability of winning the progressive jackpot 61 regardless of the amount of their respective wagers.

Figure 5:
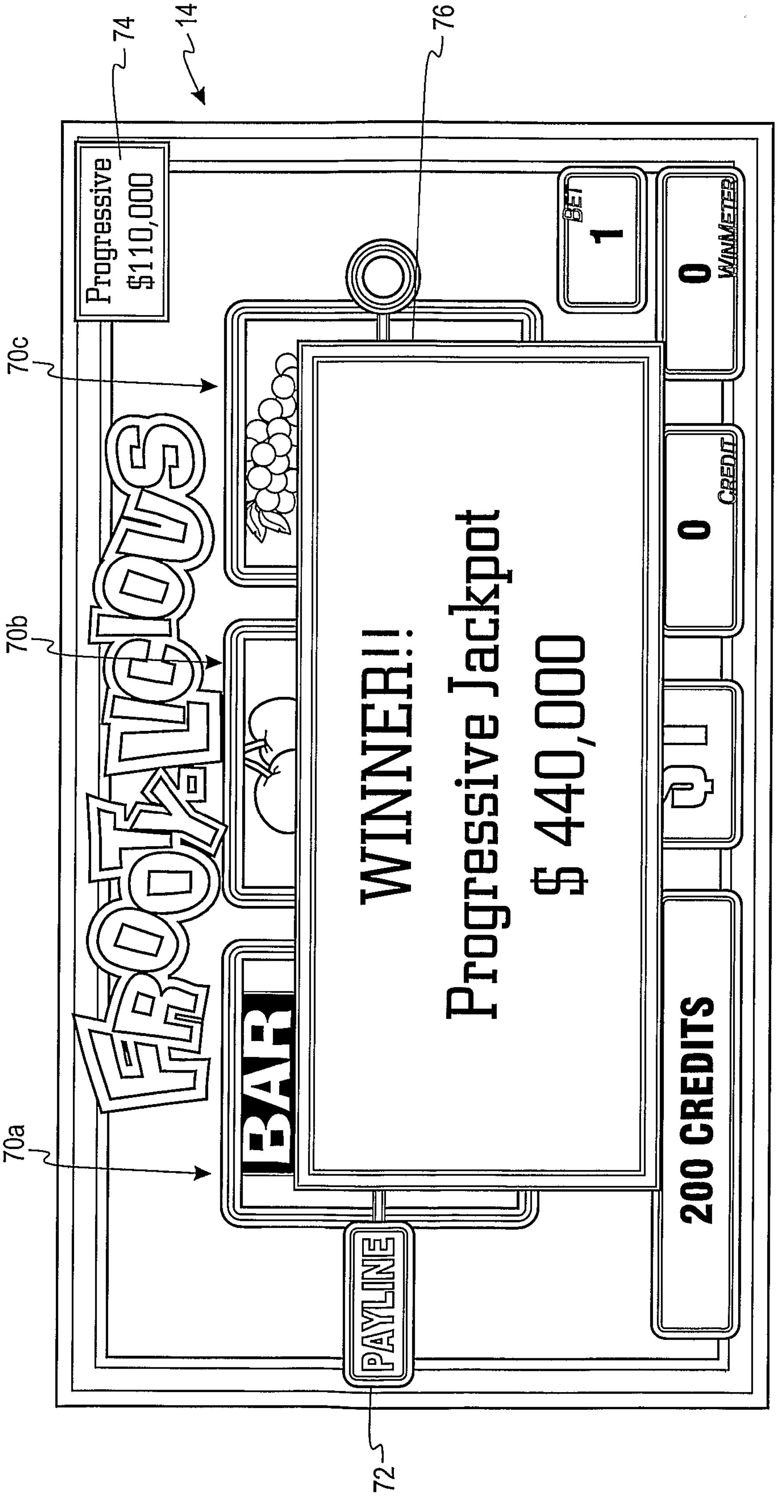
FIG. 5 is a progressive screen of the primary display of the gaming machine of FIG. 1 according to one embodiment of the invention.

Turning to FIG. 5, the display 14 of the second gaming machine 10*b* depicts the second player at the second gaming machine 10*b* winning the progressive jackpot 61. The enhanced award is available to the player on the second gaming machine 10*b* because he wagered more than the system minimum wager amount. This enhanced award is an Expected Value Equalizing Award (referred to herein as "EVEA"). The EVEA is awarded to the player to compensate him an additional amount based upon his increased or non-minimum wager. For example, referring to FIG. 5, the second player wagered $1.00 on the second gaming machine 10*b*. His $1.00 wager is four times greater than the system minimum wager amount of 25 cents. The first player (see FIG. 3) wagering 25 cents on the first gaming machine 10*a* was only eligible to win the progressive jackpot of $110,000. Consequently, the second player, whose wager was four times greater, is able to win four times as much. Because the second player's wager of $1.00 resulted in a progressive jackpot winning outcome, the second player is awarded the progressive jackpot 61 of $110,000, plus an EVEA of $330,000 to compensate him for his increased wager. Therefore, the total award awarded to the second player on the second gaming machine 10*b* is $440,000, as seen in FIG. 5. The total award is communicated to the player via a pop up window 76 on the primary display 14 if such display 14 is video, or via the secondary display 16 or an award meter. Thus, in this embodiment, the EVEA is a multiple of the progressive jackpot 61 ("P. J.") and is a function of how much the player's wager ("Player Wager") exceeds the system minimum wager amount ("Sys. Min. Wager"). The EVEA is determined by calculating the player's wager made on the gaming machine minus the system minimum wager amount, and dividing by the system minimum wager amount. The following equation represents the calculation of the EVEA:

$$EVEA = \frac{(\text{Player Wager} - \text{Sys. Min.Wager})}{\text{Sys. Min. Wager}} \times P.J.$$

Figure 6:
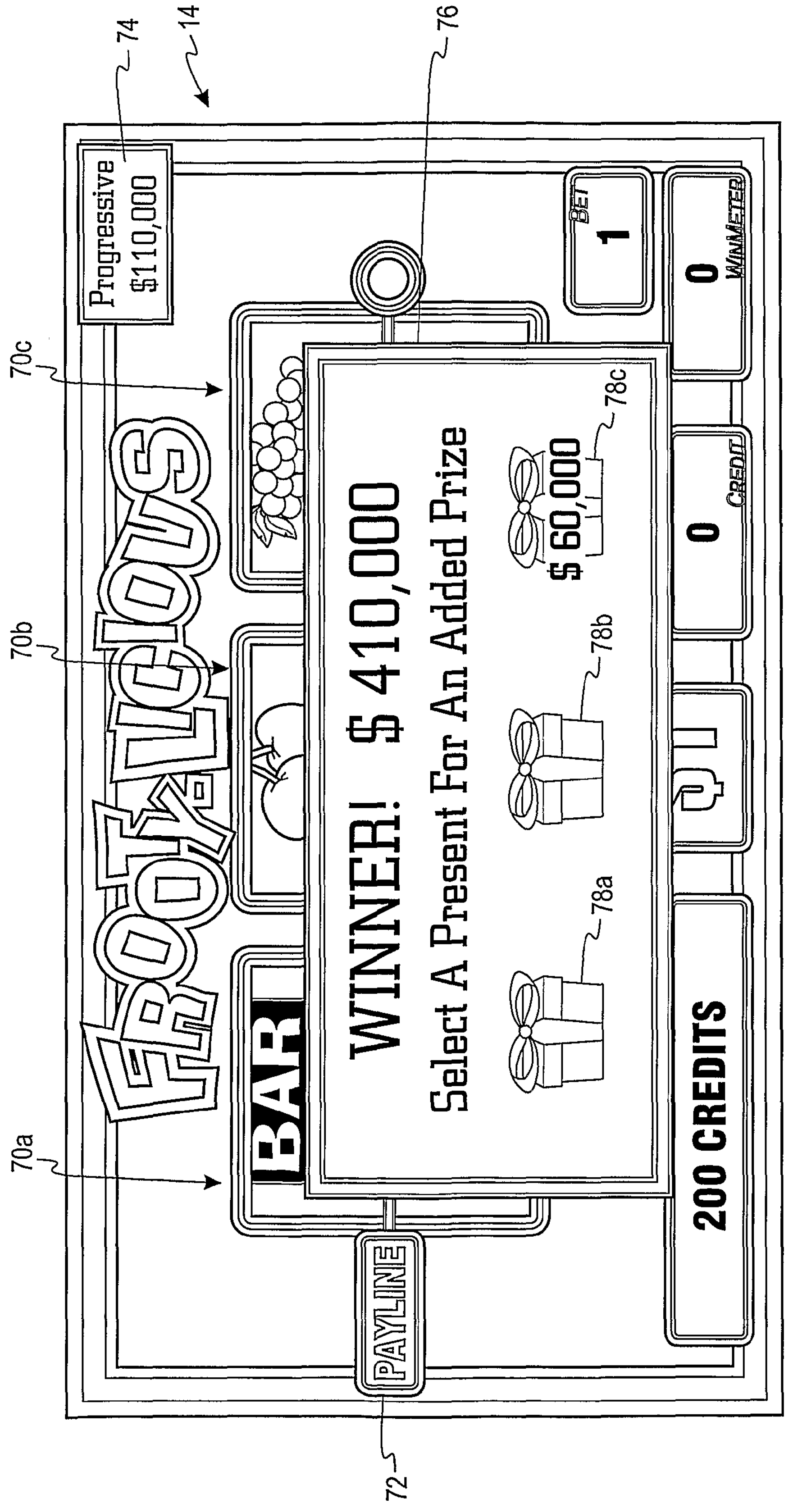
FIG. 6 is a progressive screen of the primary display of the gaming machine of FIG. 1 according to another embodiment of the present invention.

In another embodiment depicted in FIG. 6, an alternate method of awarding the player is depicted. In this embodiment, the same progressive jackpot winning outcome (Three Sevens) has occurred triggering the award of the progressive jackpot 61. Again, the player of the second gaming machine 10*b* has wagered $1.00, which is more than the system minimum wager amount (25 cents), and qualifies the player for the EVEA. In this embodiment, the player is awarded the progressive jackpot 61 ($110,000) and in addition receives the EVEA which comprises a multiple of the progressive jackpot base amount ("Base Amount"), plus a special award. Because the player's wager exceeds the system minimum wager by three times ($1.00-$0.25)/($0.25), the multiple is three. The EVEA in this embodiment is given by the formula:

$$EVEA = \frac{(\text{Player Wager} - \text{Sys. Min. Wager})}{\text{Sys. Min. Wager}} \text{Base Amount} + \text{Special Award}$$

Therefore, the EVEA in this case is three times the progressive base amount ($300,000), plus the special award. As seen in FIG. 6, the pop up window 76 displays to the player that he has won $410,000 plus provides the opportunity to the player to win a special award. The $410,000 is reflective of the progressive jackpot 61 ($110,000), plus the first portion of the EVEA (three times the base amount, or $300,000).

Here the special award is a picking game where the player is provided with a plurality of player selectable elements 78*a,b,c*, where each element is associated with a prize. The amount of the prize of the element 78*a,b,c* selected by the player is the special award. The player has selected the third element 78*c* and has received a special award of $60,000 in addition to the $410,000 awarded in the pop up window 76. The expected value, or theoretical average of the special award, is set at $30,000 in this embodiment to ensure fairness. This way, over a large number of plays of the gaming machine the expected value of the EVEA will be $330,000, and the expected value of the total award to this player will be $440,000, reflective of the player's wager being four times as large as the system minimum wager amount. However, on any particular play of the game, the special award may be greater or less than $30,000, and the total payout to the player may be greater or less than $440,000. For example, as seen in FIG. 6, the special award is equal to $60,000 making the player's total award $470,000. It should be understood that the special award may be awarded through any number of gaming features including a player interactive gaming feature, such as the selection screen described, or a gaming feature requiring no player interaction. Furthermore, although a particular special award will be dependent on the selection of elements 78_a,b,c_ made by the player, the expected value of the special award will be dependent on the incremental amount of the progressive jackpot 61. Since the incremental amount was $10,000 in this case, and the player's wager exceeded the system minimum wager by an amount equal to three times the system minimum wager, the expected value of the special award equals three times $10,000, or $30,000. Thus, the following equation sets for the calculation of the expected value of the special award in the second embodiment:

$$\text{Special Award Expected Value} = \left(\frac{\text{Player Wager} - \text{Sys. Min. Wager}}{\text{Sys. Min. Wager}}\right) \times \text{Incremental Amount}$$

Figure 7:
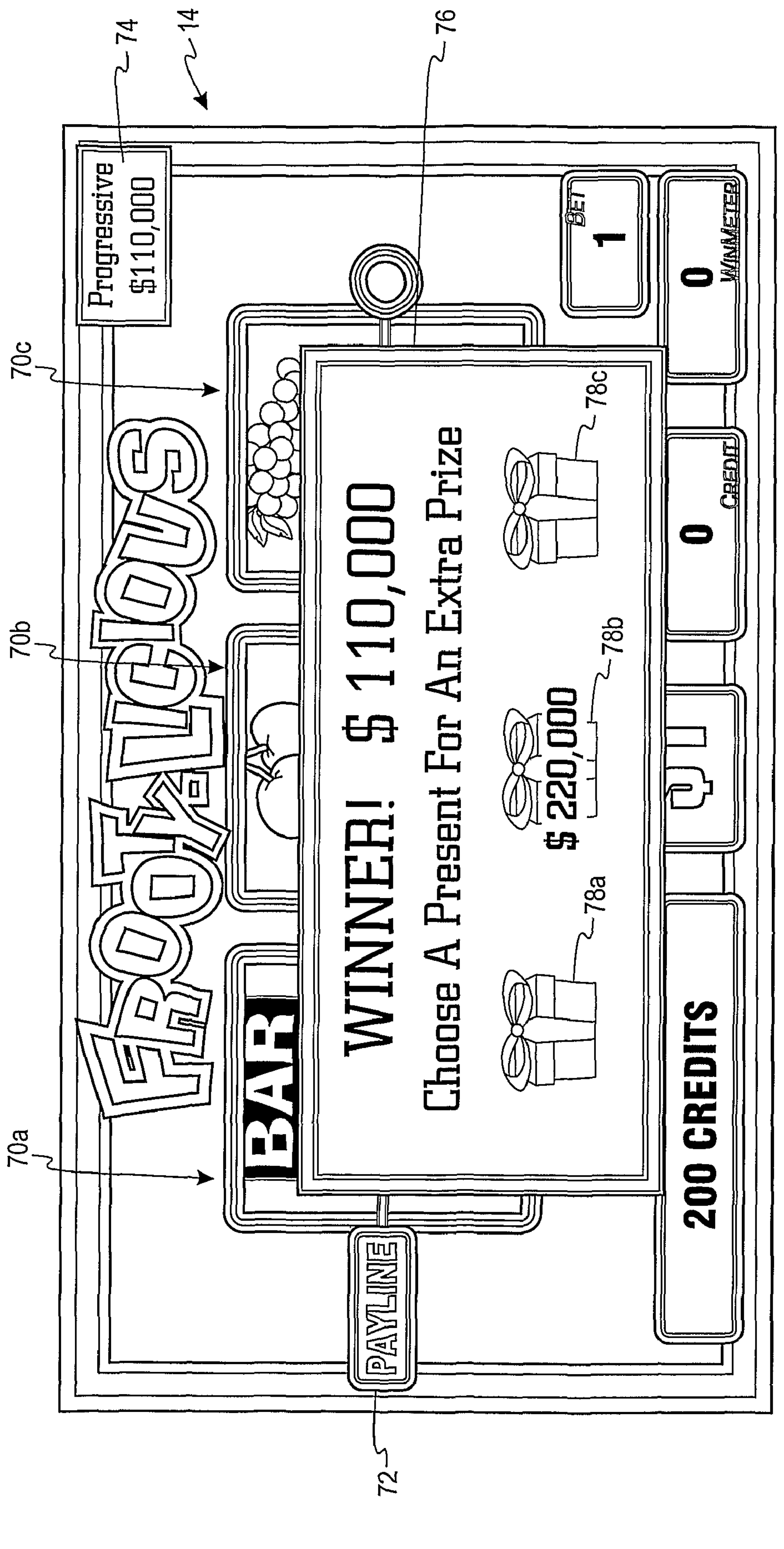
FIG. 7 is a progressive screen of the primary display of the gaming machine of FIG. 1 according to another embodiment of the present invention.

In a third embodiment of the gaming system 58 depicted in FIG. 7, the EVEA is calculated in yet another alternative manner. In this embodiment, the entire amount of the EVEA is determined via the special award. As seen in FIG. 7, the player has again wagered $1.00 on the second gaining machine 10_b_, and has achieved the progressive jackpot winning outcome. This entitles the player to the progressive jackpot 61 ($110,000) plus a special award, comprising the EVEA. The special award, as in FIG. 6, is a picking game having a plurality of player selectable elements 78_a,b,c_ with each element 78_a,b,c_ associated with a prize. The expected value of the special award is equal to $330,000 in this embodiment, and the expected value of the total award is $440,000, reflective of the player's wager being four times as large as the system minimum wager amount. However, on any particular play of the game, the special award may be greater or less than $330,000, and the total payout to the player may be greater or less than $440,000. For example, as seen in FIG. 7, the special award is equal to $220,000 making the player's total award $330,000. Furthermore, although a particular special award will be dependent on the selection of elements 78_a,b,c_ made by the player, the expected value of the special award will be dependent on the amount of the progressive jackpot 61. Since the progressive jackpot 61 was $110,000 in this case, and the player's wager exceeded the system minimum wager by an amount equal to three times the system minimum wager, the expected value of the special award equals three times $110,000, or $330,000. Thus, the following equation sets for the calculation of the expected value of the special award in the second embodiment:

$$\text{Special Award Expected Value} = \left(\frac{\text{Player Wager} - \text{Sys. Min. Wager}}{\text{Sys. Min. Wager}}\right) \times P.J.$$

In the above example, the expected values of the total award and special award are based upon the progressive jackpot 61 being triggered at $110,000. However, it should be understood that the progressive jackpot 61, being randomly triggered, may be awarded at any value in excess of the base amount of $100,000. Therefore, the expected value of the special award is based in part upon the amount of the progressive jackpot 61 when triggered.

In the second embodiment, as described, the values associated with the player selectable elements 78_a,b,c_ may not be predetermined because the amount of the EVEA is not known until after a progressive jackpot winning outcome is achieved. More specifically, as the special award portion of the EVEA is based upon the amount of the progressive jackpot 61 when triggered, the expected value of the special award cannot be calculated until the jackpot 61 is triggered. Therefore, in the second embodiment, the values associated with the player selectable elements 78_a,b,c_ can only be determined "dynamically" or "on the fly" after the progressive jackpot winning outcome was achieved, but prior to the award of the special award. A fourth embodiment allows the values of the player selectable elements 78_a,b,c_ to be predetermined.

The fourth embodiment involves the use of a progressive jackpot strike price. The strike price of the progressive jackpot 61 is the mathematical theoretical value at which the progressive jackpot 61 should be awarded to a player (that a progressive jackpot winning outcome will occur). In this embodiment, the strike price is $125,000, reflecting that after a large number of progressive jackpot winning outcomes in the system 58, the average progressive jackpot 61 awarded will be $125,000. The EVEA in the fourth embodiment is calculated with the same formula as in the second embodiment, however, instead of the special award expected value being a function of the actual incremental value, it is a function of the strike price. Using the same example as depicted in FIG. 6 relating to the second embodiment, the player has wagered $1.00 and obtained the progressive jackpot winning outcome. According to the equation for the second embodiment, the player is awarded the progressive jackpot 61 ($110,000) plus the EVEA which is given by:

$$EVEA = \frac{(\text{Player Wager} - \text{Sys. Min. Wager})}{\text{Sys. Min. Wager}} \text{Base Amount} + \text{Special Award}$$

In this case, the EVEA is equal to $300,000 plus the special award:

$$EVEA = \frac{(\$1.00 - \$0.25)}{\$0.25} \$100{,}000 + \text{Special Award}$$

Recall that in the second embodiment, the special award had an expected value of $30,000, and was awarded through the selection of one of a plurality of player selectable elements 78_a,b,c_ with corresponding prize values. The $30,000 expected value for the special award is based upon the fact that the incremental amount of the progressive jackpot 61 was $10,000 at the time the jackpot 61 was triggered, and that the triggering player had wagered an amount in excess of the system minimum wager equal to three times the system minimum wager.

In this fourth embodiment, the special award is assigned an expected value of $25,000 for each credit wagered above the system minimum wager amount, and is not a function of the exact incremental amount when the progressive jackpot 61 is won. The expected value of $25,000 is calculated based upon the strike price of $125,000 less the progressive jackpot base amount of $100,000. In other words, because the $125,000 is reflective of the average progressive jackpot amount when triggered, then $25,000 is reflective of the average incremental amount when the progressive jackpot is triggered. The expected value of the special award in the fourth embodiment is calculated as follows:

$$\text{Special Award Expected Value} = \left(\frac{\text{Player Wager} - \text{Sys. Min. Wager}}{\text{Sys. Min. Wager}}\right) \times (\text{Strike Price} - \text{Base Amount})$$

Thus, in this example, the expected value of the special award is $75,000, which is the $25,000 incremental amount of the strike price ($125,000-$100,000) multiplied by three (the number of credits that the player's wager exceeds the system minimum wager amount). The awards associated with the plurality of player selectable elements 78*a,b,c* may be predetermined to be reflective of the $75,000 expected value. In this way, the EVEA is independent of the actual amount of the progressive jackpot 61 at the time it is triggered, thereby allowing the values of the player selectable elements 78*a,b,c* to be predetermined. The EVEA remains only a function of the player's wager and the actual amount of a particular element 78*a,b,c* selected by the player.

It should be understood that regardless of the calculation of the EVEA, the EVEA is available only to a player who has achieved a progressive jackpot winning outcome and whose wager exceeded the system minimum wager amount. A player achieving a progressive jackpot winning outcome while wagering only the system minimum wager amount is awarded only the progressive jackpot 61 at the time of the trigger, but is not awarded the EVEA. In this way, the EVEA serves to compensate those players making wagers higher than the minimum, while preserving the ability for players who wager only the minimum to still win the progressive jackpot 61.

Although the present invention has been described by a progressive jackpot being triggered by an outcome in the basic wagering game, the invention can be used with progressive games having any type of triggering mechanism. For example, there are different systems for determining a progressive jackpot-won event at a gaming terminal. The first type of jackpot-won event is gaming-machine enabled, which occurs when a "progressive winning position" (i.e., a progressive jackpot winning outcome) is achieved at a participating gaming machine. A progressive-winning position is a module within a gaming machine's software code that responds with a progressive jackpot-won event when certain game-level conditions are met, such as a winning reel position on a slot machine. Only one progressive game may be assigned to a progressive winning position at a time. This position has a single winning percentage. At the time the progressive-winning position occurs at a gaming machine, the winning gaming machine is disabled from play and immediately transmits the jackpot-won event to the central system, such as external system 50 (FIG. 2). The central system calculates a final prize amount and transmits this amount to the winning gaming machine and to the other gaming terminals competing for the same progressive. The second type of jackpot-won event is central-system enabled. A progressive winning position is not used to generate a jackpot-won event when a progressive game awards a jackpot using a central-system-enabled jackpot-won event. An example may be a message sent from the central system to the gaming machine that places a wager that corresponds to a predetermined wager number (or amount) that triggers the progressive jackpot-won event. A central system-enabled jackpot-won event may, for example, be used in a mystery progressive system.

In the illustrated examples the probability of winning the progressive jackpot is independent of both the player's wager and the number of paylines played, i.e., all players have the same probability of winning the progressive jackpot regardless of the wager amount or lines played. Alternatively, the probability of winning the jackpot may be varied as a function of wager amount. This necessitates using the varying probability to further alter the value of the EVEA. To ensure fairness, it is desirable for the probability of winning the progressive jackpot 61 times the total amount of the jackpot divided by the amount of the player's wager to be held constant. This is shown by the following equation:

$$\left(\frac{\text{Probability Of Jackpot Win} \times \text{Total Amount Of Jackpot}}{\text{Wager Amount}}\right) = \text{Constant}$$

The Total Amount of the Jackpot is equal to the amount of the progressive jackpot 61 plus any EVEA that the player may be eligible to win. Thus, the equation in more detail is:

$$\left(\frac{\text{Probability Of Jackpot Win} \times (\text{Progressive Jackpot} + EVEA)}{\text{Wager Amount}}\right) = \text{Constant}$$

In an alternative embodiment, the system 58 may be configured such that the probability of winning the progressive jackpot 61 increases as the player's wager increases. If the increase in probability of winning the jackpot is larger than the relative increase in the wager amount, it is necessary to decrease the total amount of the jackpot award through a corresponding decrease in the EVEA for the equation above to remain constant.

According to another embodiment of the present invention, a player may receive an increased progressive jackpot by placing a side wager. In such an embodiment, a minimum side wager makes the player eligible for the displayed progressive jackpot. However, the player is also allowed to place a side wager that is a multiple of the minimum side wager amount in order to increase the amount won. If the player wins the progressive jackpot, the jackpot amount is increased by the multiplier. For example, if the minimum side wager is one credit, then with a one credit side wager, the player wins the displayed progressive jackpot of $110,000. If the player placed a five credit wager (five times the minimum side wager amount), then the player would win $550,000 (five times the displayed progressive jackpot). Allowing the player to place higher side wagers and increase the winnings increases player involvement and excitement.

Each of these embodiments and obvious variations thereof is contemplated as falling within the spirit and scope of the claimed invention, which is set forth in the following claims.

What is claimed is:

1. A gaming system comprising:

a progressive jackpot awarded in response to a jackpot win event;

a first gaming machine linked to the progressive jackpot, the first gaming machine accepting a first wager; and a second gaming machine linked to the progressive jackpot, the second gaming machine accepting a second wager that is greater than the first wager;

wherein a first player making the first wager at the first gaming machine is awarded the progressive jackpot if the jackpot win event is associated with the first gaming machine;

wherein a second player making the second wager at the second gaming machine is awarded the progressive jackpot plus an expected value equalizing award if the jackpot win event is associated with the second gaming machine; and wherein the progressive jackpot comprises a base amount and an incremental amount, wherein the expected value equalizing award is equal to a special award comprising a prize associated with a player selected element on the second gaming machine, the player selected element selected from a plurality of player selectable elements, and wherein the expected value equalizing award is equal to the product of (i) the difference between the second and first wagers divided by the first wager; and (ii) the progressive jackpot.

2. A gaming system comprising:

a progressive jackpot awarded in response to a jackpot win event;

a first gaming machine linked to the progressive jackpot, the first gaming machine accepting a first wager; and a second gaming machine linked to the progressive jackpot, the second gaming machine accepting a second wager that is greater than the first wager;

wherein a first player making the first wager at the first gaming machine is awarded the progressive jackpot if the jackpot win event is associated with the first gaming machine;

wherein a second player making the second wager at the second gaming machine is awarded the progressive jackpot plus an expected value equalizing award if the jackpot win event is associated with the second gaming machine; and wherein the progressive jackpot comprises a base amount and an incremental amount, wherein the expected value equalizing award is equal to a special award comprising a prize associated with a player selected element on the second gaming machine, the player selected element selected from a plurality of player selectable elements, and wherein the expected value equalizing award is equal to the sum of (i) the product of (a) the difference between the second and first wagers divided by the first wager; and (b) the base amount, and (ii) a special award.

3. The gaming system of claim 2, wherein the special award is a prize associated with a player selected element on the second gaming machine, the player selected element selected from a plurality of player selectable elements.

4. The gaming system of claim 2, wherein an expected value of the special award is equal to the product of (i) the difference between the second and first wagers divided by the first wager; and (ii) the incremental amount.

5. A gaming system comprising:

a progressive jackpot awarded in response to a jackpot win event;

a first gaming machine linked to the progressive jackpot, the first gaming machine accepting a first wager; and a second gaming machine linked to the progressive jackpot, the second gaming machine accepting a second wager that is greater than the first wager;

wherein a first player making the first wager at the first gaming machine is awarded the progressive jackpot if the jackpot win event is associated with the first gaming machine;

wherein a second player making the second wager at the second gaming machine is awarded the progressive jackpot plus an expected value equalizing award if the jackpot win event is associated with the second gaming machine; and wherein the progressive jackpot comprises a base amount and an incremental amount, wherein the expected value equalizing award is equal to a special award comprising a prize associated with a player selected element on the second gaming machine, the player selected element selected from a plurality of player selectable elements, and wherein an expected value of the special award is equal to the product of (i) the difference between the second and first wagers divided by the first wager; and (ii) the progressive jackpot.

6. The gaming system of claim 2, wherein an expected value of the special award is equal to the product of (i) the difference between the second and first wagers divided by the first wager; and (ii) the difference between (a) a strike price of the progressive jackpot and (b) the base amount.

7. A method of conducting a wagering game on a gaming system comprising a plurality of gaming machines, the gaming system having a progressive jackpot awarded in response to a jackpot win event, the method comprising:

receiving a first wager from a first player at a first gaming machine linked to the progressive jackpot via a wager input device at the first gaming machine;

receiving a second wager from a second player at a second gaming machine linked to the progressive jackpot via a wager input device at the second gaming machine, the second wager being greater than the first wager;

in response to receiving the first wager and associating the jackpot win event with the first gaming machine, awarding the progressive jackpot via the first gaming machine to the first player; and in response to receiving the second wager and associating the jackpot win event with the second gaming machine, awarding the progressive jackpot plus an expected value equalizing award to the second player via the second gaming machine, wherein the progressive jackpot comprises a base amount and an incremental amount, and wherein the expected value equalizing award is equal to the product of (i) the difference between the second and first wagers divided by the first wager; and (ii) the progressive jackpot.

8. A method of conducting a wagering game on a gaming system comprising a plurality of gaming machines, the gaming system having a progressive jackpot awarded in response to a jackpot win event, the method comprising:

receiving a first wager from a first player at a first gaming machine linked to the progressive jackpot via a wager input device at the first gaming machine;

receiving a second wager from a second player at a second gaming machine linked to the progressive jackpot via a wager input device at the second gaming machine, the second wager being greater than the first wager;

in response to receiving the first wager and associating the jackpot win event with the first gaming machine, awarding the progressive jackpot via the first gaming machine to the first player; and in response to receiving the second wager and associating the jackpot win event with the second gaming machine, awarding the progressive jackpot plus an expected value equalizing award to the second player via the second gaming machine, wherein the progressive jackpot comprises a base amount and an incremental amount, and wherein the expected value equalizing award is equal to the sum of (i) the product of (a) the difference between the second and first wagers divided by the first wager; and (b) the base amount, and (ii) a special award.

9. The method of claim 8, wherein the special award is a prize associated with a player selected element on the second gaming machine, the player selected element selected from a plurality of player selectable elements.

10. The method of claim 8, wherein an expected value of the special award is equal to the product of (i) the difference between the second and first wagers divided by the first wager; and (ii) the incremental amount.

11. A method of conducting a wagering game on a gaming system comprising a plurality of gaming machines, the gaming system having a progressive jackpot awarded in response to a jackpot win event, the method comprising:

receiving a first wager from a first player at a first gaming machine linked to the progressive jackpot via a wager input device at the first gaming machine;

receiving a second wager from a second player at a second gaming machine linked to the progressive jackpot via a wager input device at the second gaming machine, the second wager being greater than the first wager;

in response to receiving the first wager and associating the jackpot win event with the first gaming machine, awarding the progressive jackpot via the first gaming machine to the first player; and in response to receiving the second wager and associating the jackpot win event with the second gaming machine, awarding the progressive jackpot plus an expected value equalizing award to the second player via the second gaming machine, wherein the progressive jackpot comprises a base amount and an incremental amount, and wherein the expected value equalizing award is equal to a special award comprising a prize associated with a player selected element the second gaming machine, the player selected element selected from a plurality of player selectable elements.

12. The method of claim 11, wherein an expected value of the special award is equal to the product of (i) the difference between the second and first wagers divided by the first wager; and (ii) the progressive jackpot.

13. The method of claim 8, wherein an expected value of the special award is equal to the product of (i) the difference between the second and first wagers divided by the first wager; and (ii) the difference between (a) a strike price of the progressive jackpot and (b) the base amount.

14. A method of conducting a wagering game on a gaming system comprising a plurality of gaming machines, the gaming system having a progressive jackpot awarded in response to a jackpot win event, the method comprising:

receiving a first wager from a first player at a first gaming machine linked to the progressive jackpot via a wager input device at the first gaming machine;

receiving a second wager from a second player at a second gaming machine linked to the progressive jackpot via a wager input device at the second gaming machine, the second wager being greater than the first wager;

in response to receiving the first wager and associating the jackpot win event with the first gaming machine, awarding the progressive jackpot via the first gaming machine to the first player; and in response to receiving the second wager and associating the jackpot win event with the second gaming machine, awarding the progressive jackpot plus an expected value equalizing award to the second player via the second gaming machine, wherein the progressive jackpot comprises a base amount and an incremental amount, and wherein the progressive jackpot increments based upon a predetermined percent of the first wager.

* * * * *